United States Patent
Oh et al.

(10) Patent No.: US 7,979,589 B2
(45) Date of Patent: Jul. 12, 2011

(54) METHOD, APPARATUS, AND SYSTEM FOR PORT MULTIPLIER ENHANCEMENT

(75) Inventors: Kyutaeg Oh, San Ramon, CA (US); Eunjoo Hwang, Sunnyvale, CA (US); Richard J. Wilcox, Huntington Beach, CA (US); Conrad Maxwell, Corona, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 262 days.

(21) Appl. No.: 12/075,954

(22) Filed: Mar. 14, 2008

(65) Prior Publication Data

US 2009/0234994 A1 Sep. 17, 2009

(51) Int. Cl.
*G06F 3/00* (2006.01)
*G06F 13/00* (2006.01)

(52) U.S. Cl. .................................. 710/2; 710/8; 710/62
(58) Field of Classification Search .................. None
See application file for complete search history.

(56) References Cited

U.S. PATENT DOCUMENTS

2007/0022228 A1 1/2007 Hicks et al.
2007/0180172 A1* 8/2007 Schmidt et al. ............... 710/105

FOREIGN PATENT DOCUMENTS

EP 1811396 7/2007
WO WO-2007135695 11/2007

OTHER PUBLICATIONS

Huffman, Amber, Serial ATA II: Port Multiplier, Mar. 25, 2003, serialata.org [online, accessed on Feb. 25, 2011], URL: http://www.serialata.org/documents/pm_100_Gold.pdf.*
International Search Report & Written Opinion mailed Mar. 4, 2010 for International Application No. PCT/US2009/037031.
"Serial ATA International Organization: Port Multiplier", Dell Computer Coproraton et al.; Revision 1.2 Jan. 27, 2005; XP008071157, pp. 1-38.

* cited by examiner

*Primary Examiner* — Tariq Hafiz
*Assistant Examiner* — Scott Sun
(74) *Attorney, Agent, or Firm* — Blakley, Sokoloff, Taylor & Zafman LLP

(57) ABSTRACT

A method, apparatus and system are provided for enhancing port multipliers. In one embodiment, a port multiplier is configured to couple a network host with port multipliers. The port multiplier includes a top port multiplier to establish and maintain communication with each of the port multipliers to communicate with the network host, and the port multipliers having intermediate port multipliers and/or bottom port multipliers. Further, network devices are in communication with the port multipliers, the port multiplier, and the network host.

18 Claims, 17 Drawing Sheets

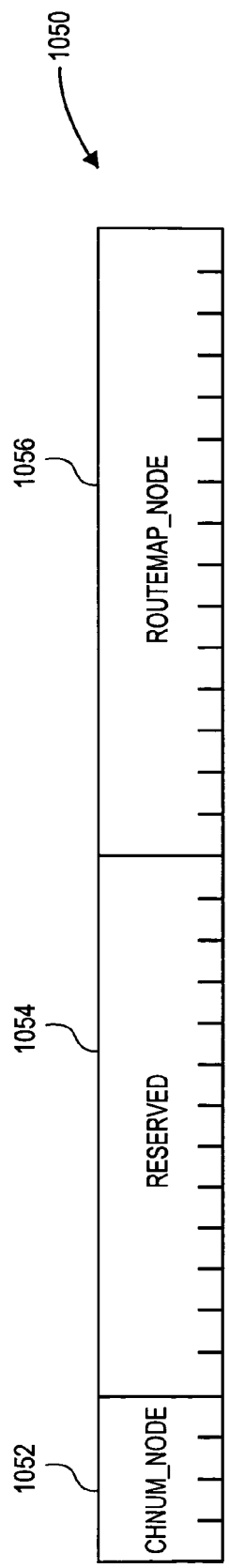

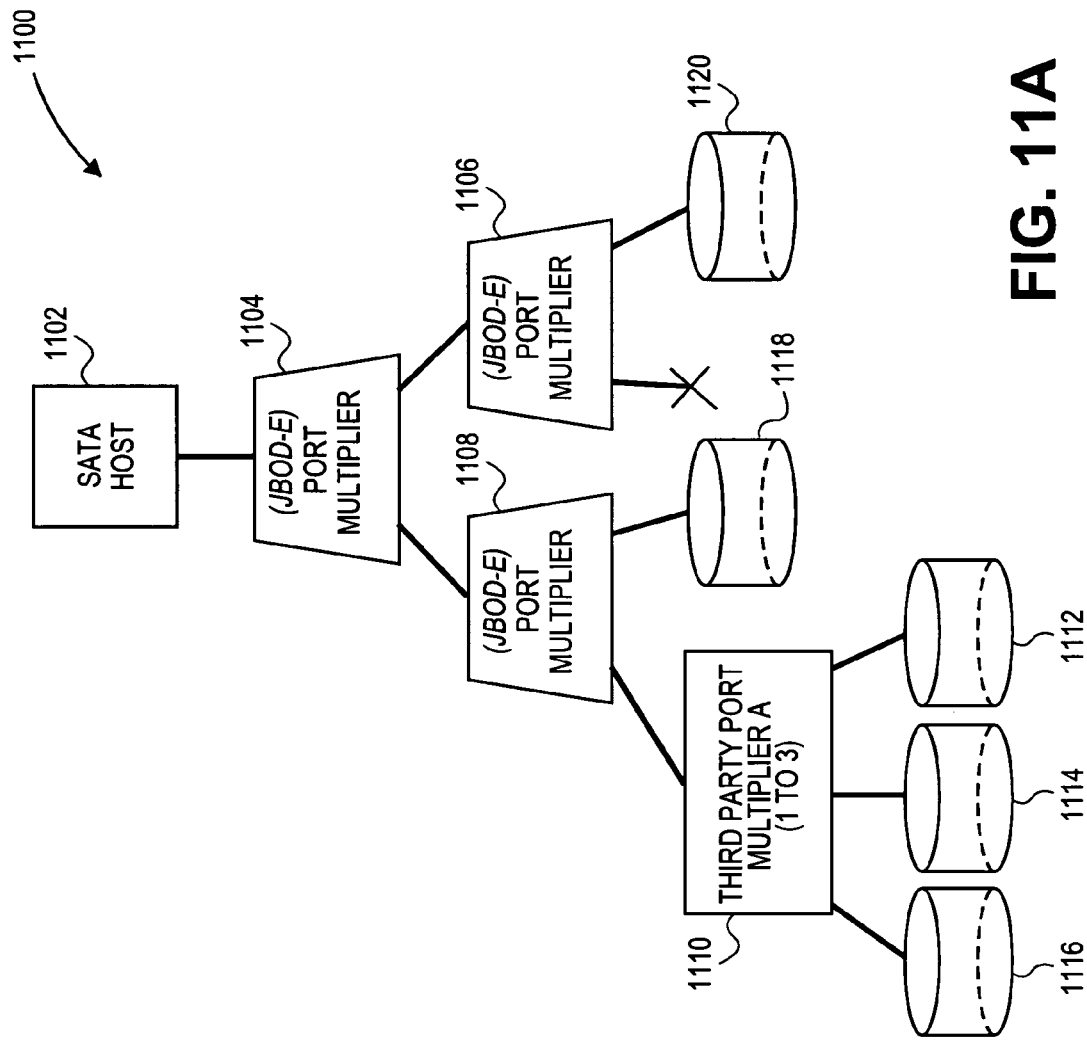

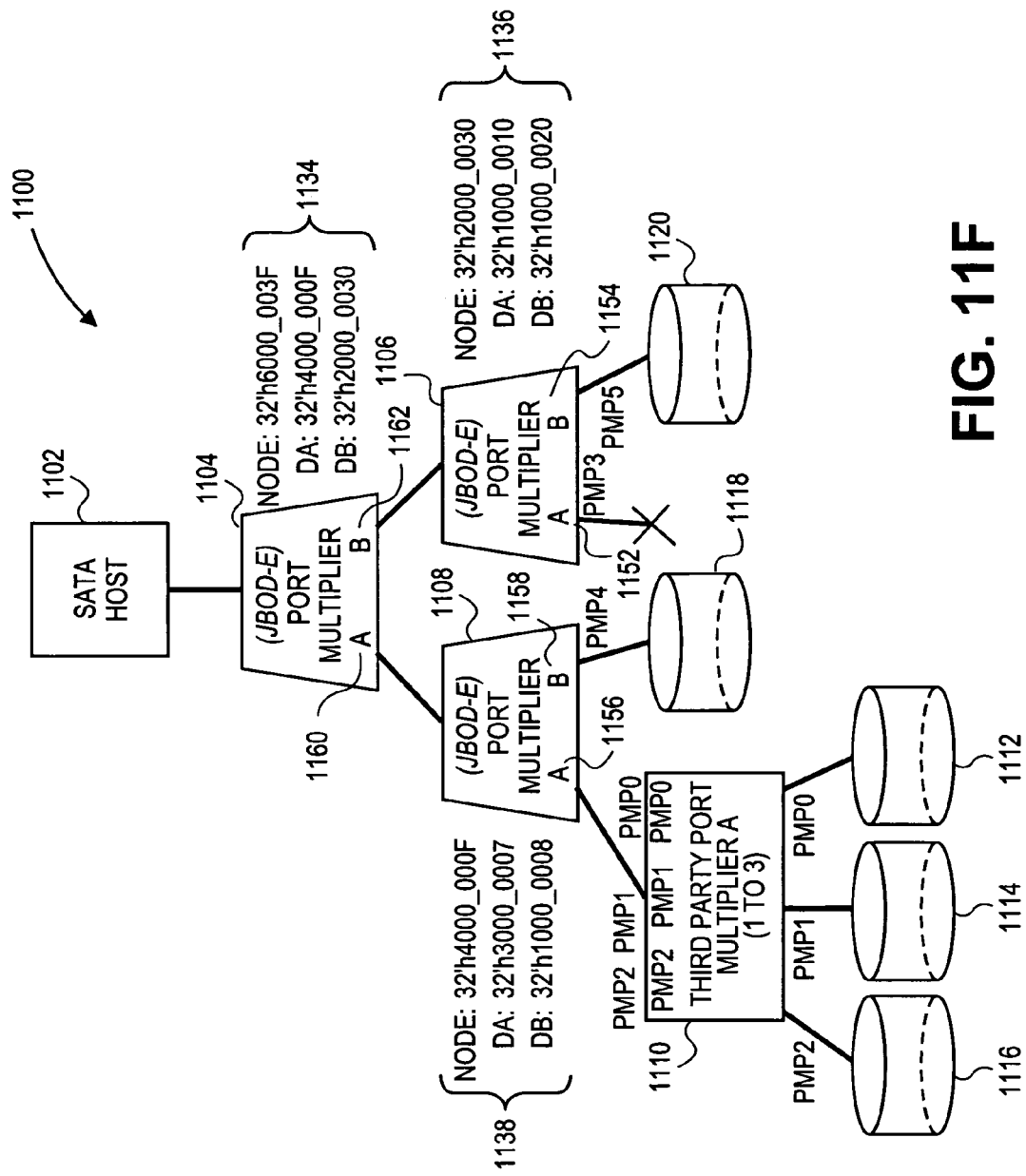

METHOD, APPARATUS, AND SYSTEM FOR PORT MULTIPLIER ENHANCEMENT

FIELD

Embodiments of the invention generally relate to the field of networks and, more particularly, to a method, apparatus, and system for port multiplier enhancement.

BACKGROUND

A network may include an interconnection of multiple personal electronic media devices. The various media devices may be networked together in order to share data, increase convenience, and make fuller use of each element. However, conventional mechanisms prevent users from enjoying potential benefits of various elements and components, such as port multipliers, by limiting advanced features and operations of such port multipliers. For example, conventional mechanisms do not allow cascading of port multipliers, limiting a standard port multiplier to have only a single level of connecting devices. FIG. 1 illustrates a conventional mechanism that does not allow a port multiplier 104 to cascade and thus, merely a single level 116 of devices 106, 108 is allowed to be connected to the port multiplier 104 via two device ports 112, 114 of the port multiplier 104. The port multiplier 104 that is connected to a host 102 via a host port 110. Stated differently, the illustrated prior art technique does not allow for the port multiplier 104 to cascade into additional devices that can be coupled with the port multiplier 104. The 1:2 port multiplier 104 is limited to a single level 116 of no more than two devices 106, 108 which, consequently, limits the advanced features and several benefits of the port multiplier 104 and the illustrated network 100 employing the port multiplier 104.

The port multiplier 104 of FIG. 1 may include a Serial Advanced Technology Attachment ("SATA" or "Serial ATA") port multiplier that is a SATA-IO standard-compliant port multiplier. SATA 1.0 specification and a later SATA II Port Multiplier specification are available at www.serial-ata.org. Serial ATA International Organization: Serial ATA Revision 2.5, 27 Oct. 2005 (available at www.serialata.org) is a revision of earlier SATA specifications and includes information about a SATA port multiplier in, for example, chapter 16. The net result is that the consumer is not able to obtain an easy-to-use low-cost port multiplier capable of providing high-end features and benefits because it is not allowed to cascade.

SUMMARY

A method, apparatus and system are provided for facilitating port multiplier enhancement.

In one embodiment, an apparatus includes a port multiplier is configured to couple a network host with port multipliers. The port multiplier includes a top port multiplier to establish and maintain communication with each of the port multipliers to communicate with the network host, and the port multipliers having intermediate port multipliers and/or bottom port multipliers. Further, network devices are in communication with the port multipliers, the port multiplier, and the network host.

In one embodiment, a system includes a port multiplied network configured to couple a network host to a plurality of network devices. The port multiplied network including a port multiplier configured to couple the network host with a plurality of port multipliers. The port multiplier including a top port multiplier to establish and maintain communication with each of the plurality of port multipliers to communicate with the network host, the plurality of port multipliers having one or more of intermediate port multipliers and bottom port multipliers, and the plurality of network devices in communication with the plurality of port multipliers and further in communication with the port multiplier and the network host.

In one embodiment, a method includes coupling a network host with a plurality of port multipliers via a port multiplier. The port multiplier includes a top port multiplier to establish and maintain communication with each of the plurality of port multipliers to communicate with the network host, the plurality of port multipliers having one or more of intermediate port multipliers and bottom port multipliers. Establishing communication between a plurality of network devices and the plurality of port multipliers, the port multiplier, and the network host.

BRIEF DESCRIPTION OF THE DRAWINGS

Embodiments of the invention are illustrated by way of example, and not by way of limitation, in the figures of the accompanying drawings in which like reference numerals refer to similar elements:

FIG. 9 illustrates an embodiment of a process for settling route map registers after power-on;

FIG. 10B illustrates an embodiment of a route map register for a port multiplier;

FIG. 10C illustrates an embodiment of a route map register for a device port for a device; and FIGS. 11A-11F illustrate an embodiment of a transaction sequence for settling route map registers.

DETAILED DESCRIPTION

Figure 1:
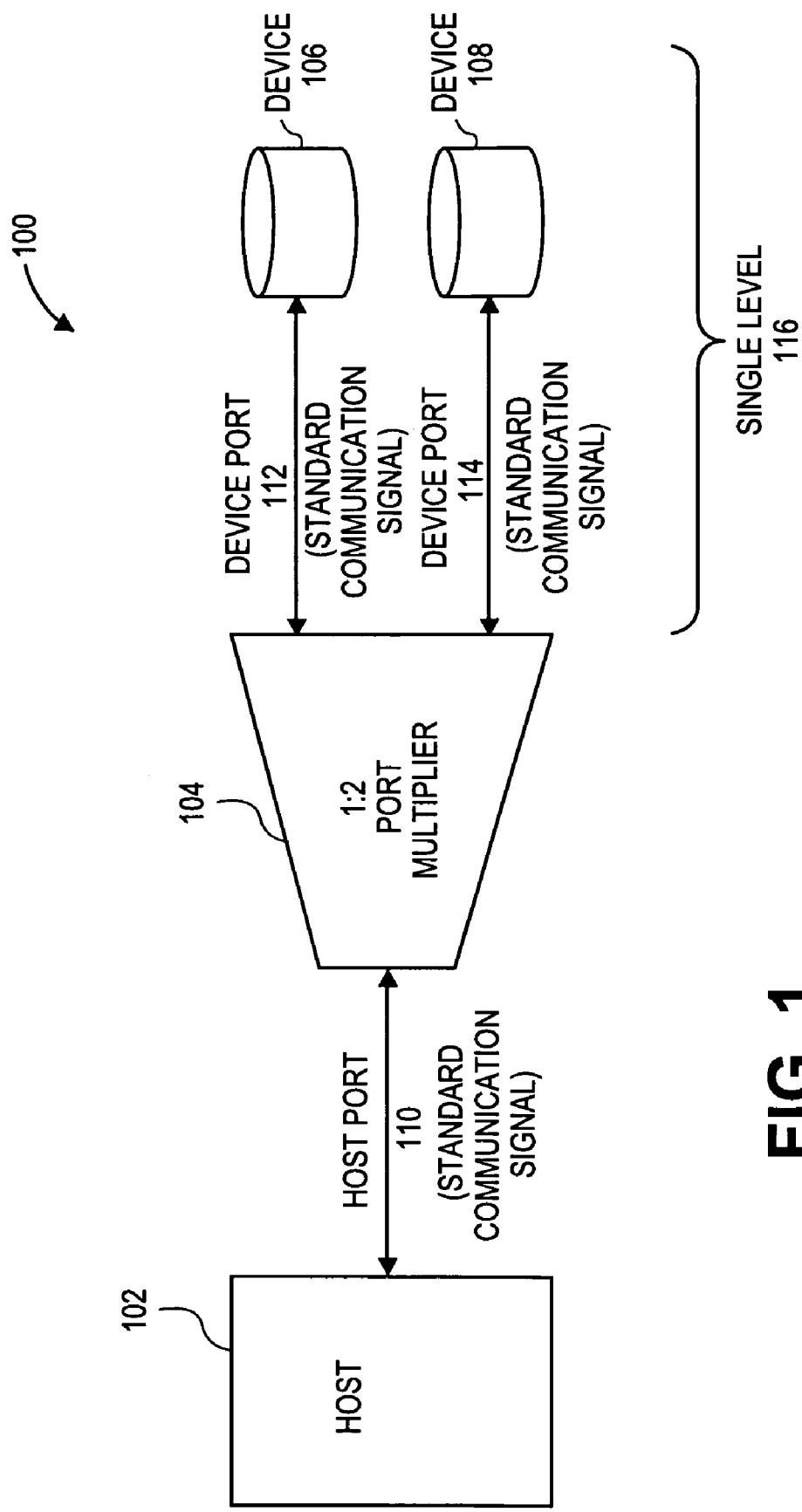
FIG. 1 illustrates a conventional mechanism employing a port multiplier.

Embodiments of the invention are generally directed to port multiplier enhancement.

As used herein, "network" or "communication network" mean an interconnection network to deliver digital media content (including music, audio/video, gaming, photos, and others) between devices. In a port multiplier network, for example, is primarily used to deliver SATA, Frame Information Structure (FIS), etc., via one or more port multipliers; although, the SATAs and FISes being delivered may contain a form of digital media. An entertainment network may include a personal entertainment network, such as a network in a household, a network in a business setting, or any other network of devices and/or components. In a network, certain network devices may be a source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

It is to be noted that in the subsequent figures and throughout this document a ratio of 1:15 is used merely as an example of the maximum number of levels (e.g., number of network devices and port multipliers) that can be liked to a network host (e.g., standard SATA host) via the main or top port multiplier that is in actuality a 2-port port multiplier (e.g., standard SATA port multiplier 1:2). Stated differently, in one embodiment, a standard 1:2 port multiplier acts as an enhanced 1:15 port multiplier such that it is cascaded into accepting any number of devices (e.g., fifteen devices and fifteen port multipliers), while the network host is faked into recognizing and treating the standard 1:2 port multiplier as an enhanced 1:15 port multiplier as having fifteen ports (although, physically, it has two ports).

Using this technique, for example, one port of the port multiplier is used as a regular device port to connect a network device (e.g., disk drive), while the second port is used as an expansion port to accept another standard 1:2 port multiplier to act as an enhanced 1:15 port multiplier and so on and so forth. It is contemplated that both ports of the port multiplier can be used as expansion ports, in which case, two additional port multipliers can be connected to it. On the contrary, the two ports of any of the port multipliers in a cascading chain can be used as standard device ports to accept up to two network devices, particularly if the cascading is to be ended. It is contemplated that, in some embodiments, a port multiplier can be enhanced into acting as having a number of ports and that the number of ports is not limited to fifteen, while a host is faked into recognizing the port multiplier as having the said number of ports. Throughout this document, the maximum number of cascading levels of a top port multiplier or the number of devices and additional port multipliers that can be cascaded into connecting with the top port multiplier is shown as fifteen; however, it is contemplated that up to fifteen levels or fifteen port multipliers or fifteen devices (e.g., enhanced 1:15 port multiplier) is used merely as an example for brevity and clarity and that the maximum number could be any number (e.g., the maximum number for the SATA protocol is fifteen), while the minimum number could be zero.

A port multiplier refers to a silicon-based device that allows its ports to communicate with multiplier devices (e.g., hard drives). The ports may include Serial ATA ports. A port multiplier may reside on an enclosure's backplane of a motherboard and may be transparent to the devices including SATA drives. In one embodiment, port multipliers allow cost-effective and expanded drive scalability to storage systems that are relatively simple mechanisms that allow for a single active host to communicate devices. Further, port multipliers allow for easy, cost-effective storage scalability both inside and outside a personal computer (PC) or server with devices, and additional controllers are not needed to expand storage. Not having additional controllers allows significantly higher performance in external storage than others, such as Universal Serial Board (USB) hard drive (e.g., USB 1.1, 2.0, etc.), Firewire™, and the like. A SATA host includes a computer system host that communicates with SATA hard drives via a port multiplier.

Figure 2:
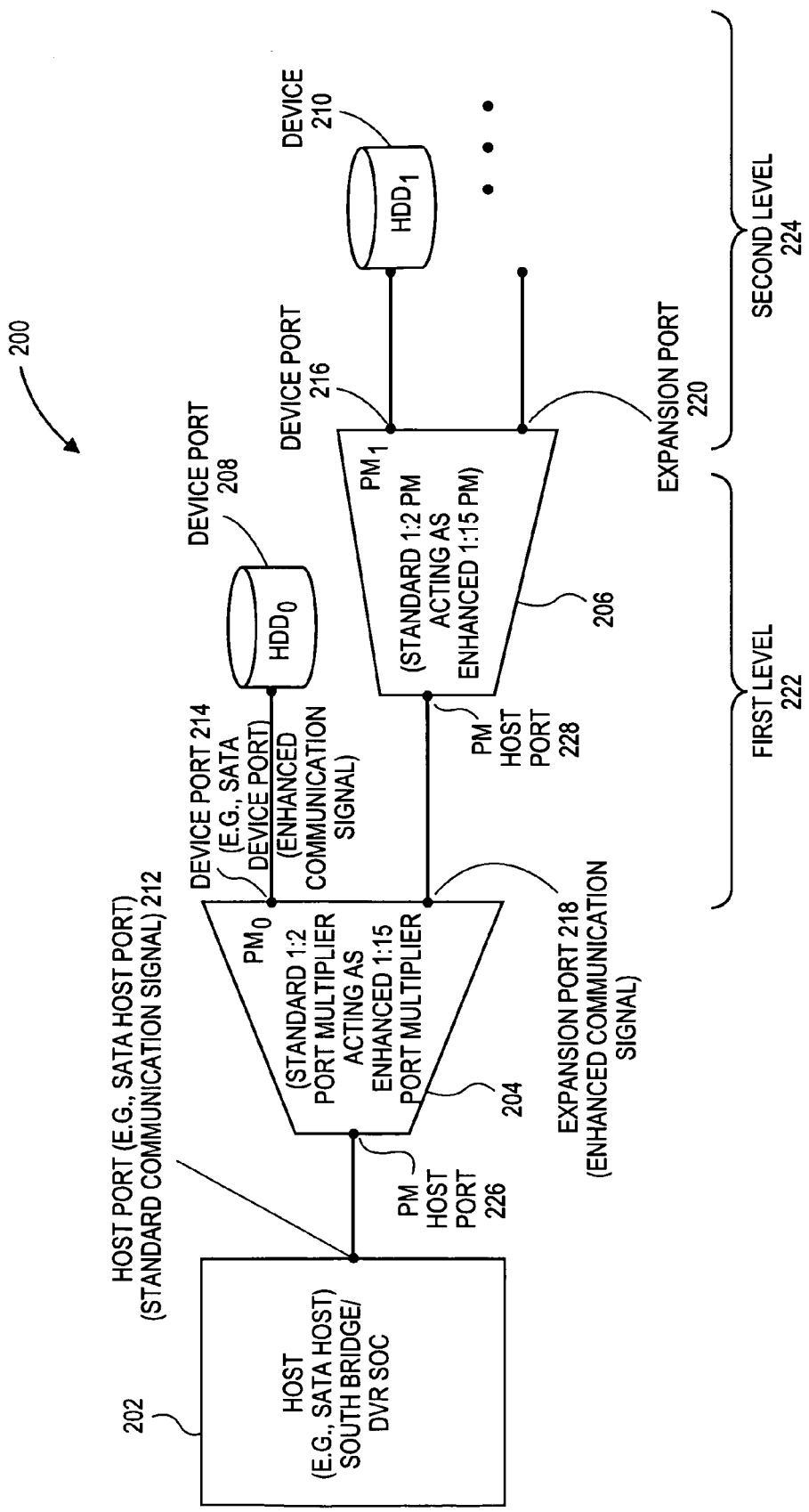
FIG. 2 illustrates an embodiment of a network employing an embodiment of a port multiplier enhancement mechanism.

FIG. 2 illustrates an embodiment of a network 200 employing an embodiment of a port multiplier enhancement mechanism. In one embodiment, a standard 1:2 port multiplier 204 (e.g., standard SATA port multiplier) is employed in communication with a host 202 (e.g., SATA host) using a standard communication signal (e.g., standard SATA communication signal). In one embodiment, using a novel port enhancement protocol, the standard port multiplier 204 (top port multiplier) is enhanced into acting as an enhanced 1:15 port multiplier. In other words, although the port multiplier 204 has merely two physical ports and remains physically unchanged, the port multiplier 204 is logically enhanced such that it acts as an enhanced port multiplier of fifteen ports and is cascaded into multiple levels 222, 224. In one embodiment, along with the enhancing of the port multiplier 204 using the port enhancement protocol, the host is made to recognize the port multiplier 204 as having fifteen ports (when in actuality it has merely two ports).

The top port multiplier 204 is coupled with the host 202 through a host-based host port 212 and a port multiplier-based host port 226. The first device port 214 of the port multiplier 204 is used as a device port to connect a network device 208. The second device port of the port multiplier 204 is used as an expansion port 218 to cascade into connecting another port multiplier 206 via its host port 228. Like the top port multiplier 204, the second port multiplier 206 also includes a standard 1:2 port multiplier but is enhanced into acting like an enhanced 1:15 port multiplier for further cascading via its expansion port 220 and device port 216. The second device 210 and a third port multiplier (not shown) connected to the second port multiplier 206 form a second level 224 of cascading, while the second port multiplier 206 and the first device 208 form a first level 222 of cascading. In one embodiment, this form of cascading could continue for fifteen levels without any port multipliers 204, 206 (and those not shown) having more than two physical ports without adding any hosts to the single illustrated host 202. In subsequent figures, a number of practical implementations (e.g., daisy chain implementation, pyramid or hub style implementation, etc.) of the port multiplier enhancement network 200 are illustrated.

Figure 3:
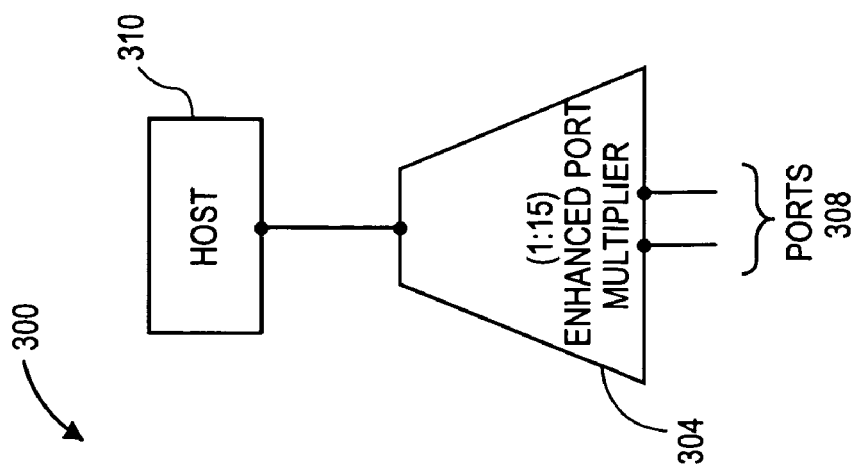
FIG. 3 illustrates an embodiment of a port multiplier enhancement mechanism.
Figure 3:
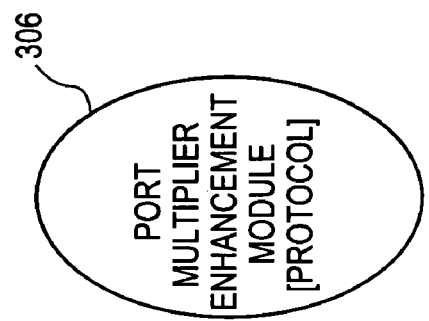
Figure 3:
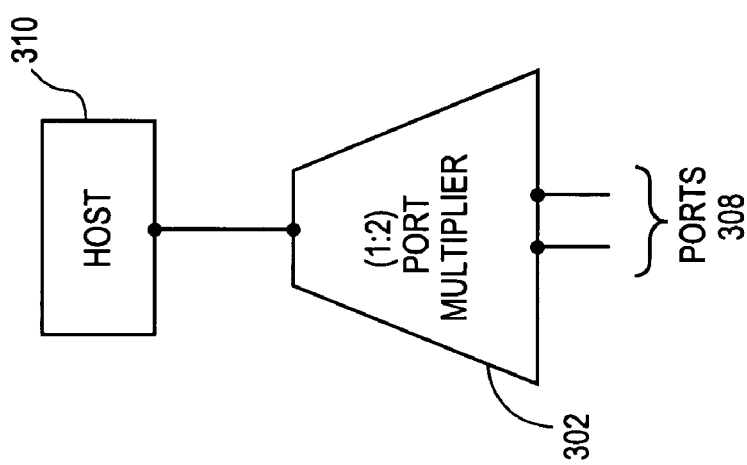

FIG. 3 illustrates an embodiment of a port multiplier enhancement mechanism 300. In one embodiment, the port multiplier enhancement mechanism 300 employs a port multiplier enhancement module (enhancement module) 306 having a port multiplier enhancement protocol (enhancement protocol) to enhance a standard 1:2 port multiplier 302 having two physical ports 308 into an enhanced 1:15 port multiplier 304 having the same two physical ports 308. However, the enhanced 1:15 port multiplier is capable of being cascaded at several levels into accepting up to fifteen of additional port multipliers and network devices. Network devices include ATA packet interface (ATAPI) devices, ATA devices, and the like In one embodiment, the novel enhancement protocol of the novel enhancement module 306 includes the needed elements, ranging from power-up enumeration sequence, hot-plugging/unplugging support, control-based or FIS-based delivery mechanisms, etc., to establish both the standard communication as well as enhanced communication, as applicable, between hosts, port multipliers, and the network devices. In one embodiment, Just a Bunch of Disks (JBOD) is modified into JBOD enhanced (JBOD-E) to from the novel enhancement protocol of the enhanced module 306 to be used to enhance port multipliers, such as the port multiplier 302.

The controller treats each drive as a stand-alone disk and therefore, each drive is an independent logical drive. JBOD does not provide data redundancy. Further, a network employing enhanced port multipliers 304 includes a JBOD-E-based or JBOD-E-compatible network, while certain standard elements and components of the network are JBOD-compatible but are capable of functioning with other JBOD-E-compatible elements and components. JBOD refers hard disks that are not configured in accordance with Redundant Array of Independent (or Inexpensive) Disks (RAID). RAID refers to a subsystem of disk drives to improve performance and fault tolerance. In other words, RAID refers to a category of disk drives that employ multiple drives in combination for performance and fault tolerance. RAID refers to a technology that supports the integrated use of two or more hard disk drives in various configurations for the purposes of achieving greater performance, reliability through redundancy, and/or larger disk volume sizes through aggregation.

Figure 4:
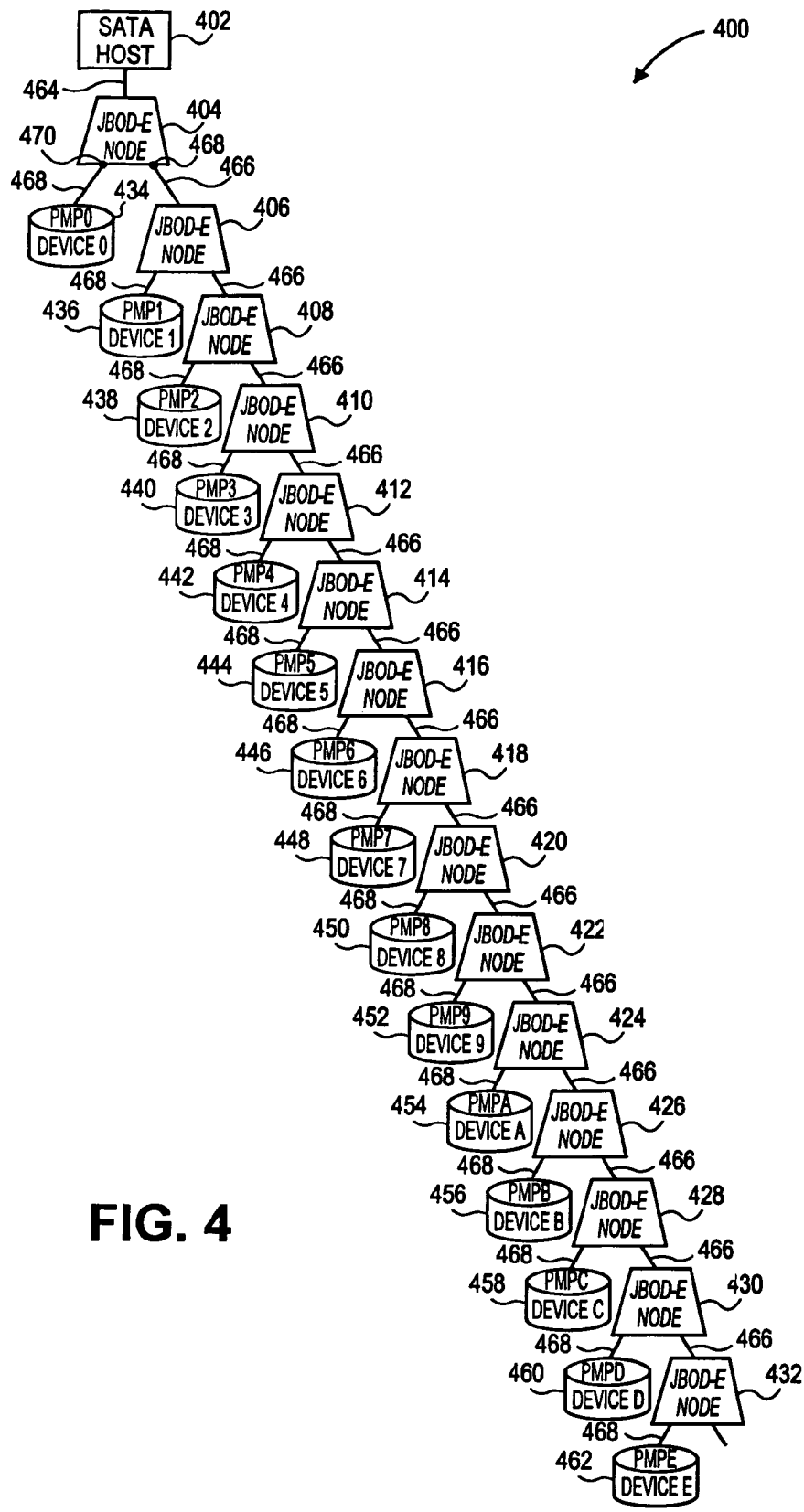
FIG. 4 illustrates an embodiment of a network employing an embodiment of a port multiplier enhancement mechanism.

FIG. 4 illustrates an embodiment of a network 400 employing an embodiment of a port multiplier enhancement mechanism. In one embodiment, the network 400 illustrates a daisy chain style cascading enhancement of a port multiplier 404. In the illustrated embodiment, the port multiplier 404 is enhanced into cascading, adding another port multiplier 406 and a device 434. Similarly, the port multiplier 406 is also enhanced into cascading, adding another port multiplier 408 and another device 436. This cascading process continues until port multiplier 432 and device 462 are adding to the chain. It is contemplated that any number of devices more or less than the fifteen devices 434-462 illustrated here can be cascading off the port multiplier 404.

In one embodiment, the port multiplier 404 is connected to a host 402. A communication signal between the host 402 and the top enhanced port multiplier 404 is regarded a standard SATA signal 464. However, communication signals subsequent to the top enhanced port multiplier 404 are regarded as enhanced SATA signals 466, 468. Stated differently, a standard SATA signal 464 is maintained between the top enhanced port multiplier 404 and the host 402 to comply with the SATA specification and maintain a standard communication between the devices 402, 404. However, the host 402 is faked into recognizing the top enhanced port multiplier 404 as having fifteen ports which allows for the top enhanced port multiplier 404 to be cascaded into having additional enhanced port multipliers 406-432 and devices 434-462 using enhanced SATA signals 466, 468.

Each enhanced port multiplier 404-432 is regarded as a node, while port multiplier 404 is regarded as the top port multiplier that is connected with the SATA host 402, and the last port multiplier 432 that is connected with the last device 462 is regarded as bottom node. Further, a port multiplier connected with a third-party port multiplier (not shown) is also regarded as a bottom node since it is regarded as the last JBOD- or JBOD-E-based SATA port multiplier; although, it is contemplated that the third-party port multiplier may be JBOD-compatible. Moreover, each node is considered a parent and/or child node. A node that is attached to the host port of the current node is regarded as parent, while a node that is attached to the device port of the current node is regarded as child. For example, port multiplier 408 serves as a parent node to port multiplier 410, while serving as a child node to port multiplier 406. Thus, port multiplier 408, like port multipliers 406, 410-430, are regarded as intermediary nodes with each node 408-430 serving both as parent and child. Using this technique, the top port multiplier 404 serves only as a parent—to port multiplier 406—since it is without a parent node. In contrast, the bottom port multiplier 432 serves only as a child—to port multiplier 430—since it is without a child node. In one embodiment, network 400 is JBOD-E standard network employing the JBOD-E protocol; however, other forms of protocols are contemplated and can be employed.

In terms of data routing, route map (RouteMap) registers are employed at each node 404-432 to facilitate communication of data between nodes 404-432 amongst other tasks. For example, each node 404-432 may manage a set of registers to address the ports in this JBOD-E standard network 600. A port refers to a connection point that facilitates connecting one node with another node. Each SATA port multiplier 404-432 illustrated here, for example, has two ports, while a third-party multiplier could have a different number of ports. The two ports of each port multiplier 404-432 may include a device port (e.g., device port 470) to connect a device (e.g., device 434) and a host port 468 to connect another port multiplier (e.g., port multiplier 406) as is the case with port multiplier 404.

In one embodiment, a bottom node 432 gets its RouteMap register updated without any dependency. If the bottom node 432 is requested to report RouteMap register, the bottom node 432 provides the RouteMap register contents to its parent node (e.g., up node) 430. The parent node 430 now has a valid RouteMap register and can respond to its parent node 428, accordingly. Repeating this process, eventually, the top node 404 is able to read the RouteMap registers of its child node 406. Once the top node 404 reads the RouteMap register of its child node 406, the top node 404 then allocates a Port Multiplier Port (PMP) to its child node 406, which then distributes a PMP to its child node 408 and so on until, eventually, the bottom node 432 receives a PMP from its parent node 430 and the RouteMap registers at all nodes 404-432 are settled.

To figure out the topology of this JBOD-E network 400, host 402 accesses each node 404-432 to read their respective RouteMap registers. However, since each node 404-432 in the network 400 may not have its own identification number and therefore, addressing each of the individual nodes 404-432 from the host 402 may not be easy. To overcome this obstacle, an embodiment of the technique of tokens is introduced, and the RouteMap register from a node 404-432 where the token belongs to is to be returned as a result of a command (e.g., Read Port Multiplier command). A token can be moved forward or backward by updating the corresponding token information register (e.g., TokenInfo register). Some features of this technique/process may include: (1) a single token is made available in the entire JBOD-E network 400; (2) by default, forward (e.g., FWARD) and backward (e.g., BWARD) in each node 404-432 of the JBOD-E network 400 is set at zero; (3) If FWARD of a particular node, such as node 406, are all zero, then that node 406 has a token; (4) to access the RouteMap register of a down node port multiplier, such as node 406, connected to an up node, such as the top node port multiplier 404, the host 402 updates bit0 of FWARD to one. Then, the token belongs to the down node port multiplier 406 that is connected to the up node port multiplier 404. Further, when the host 402 issues a command to read port multiplier (e.g., Read Port Multiplier command) to obtain a RouteMap register, the response is received from the down node port multiplier 406 coupled with the up node port multiplier 404. To reach all nodes 404-432, advancing of RouteMap registers is performed by repeating this process, such as advancing the RouteMap register between various nodes 404-432 until it from the bottom node 432 it reaches the host 402. To move the token backward, the host 402 writes a RouteMap to BWARD bit of a TokenInfo register. For brevity and clarity, a simplified network 400 is illustrated; however, it is contemplated that any number of port multipliers acting as enhanced port multipliers, devices, and/or third-party port multipliers may be employed in a network.

Figure 5A:
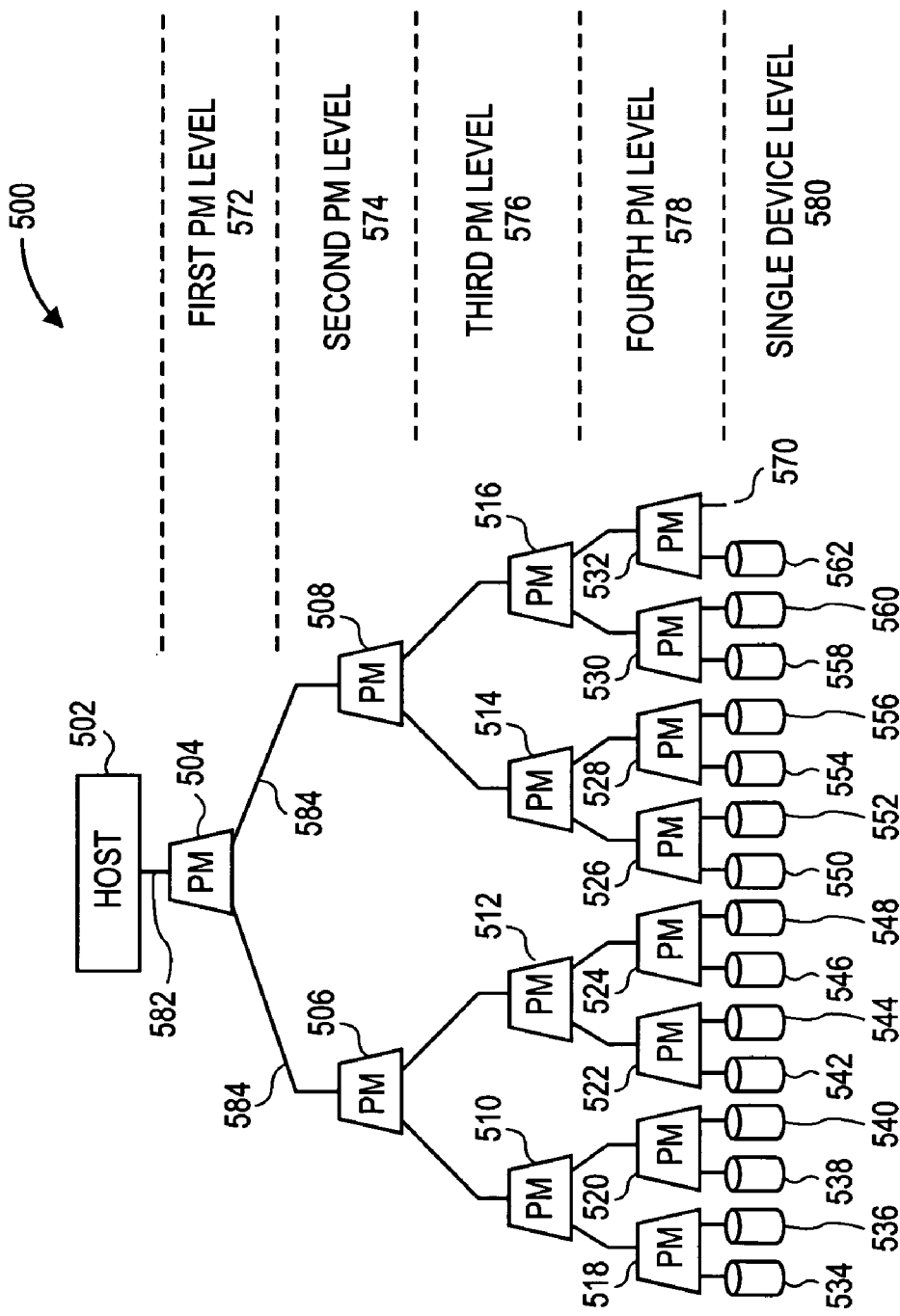
FIG. 5A-5B illustrate embodiments of a network employing an embodiment of a port multiplier enhancement mechanism.

FIG. 5A illustrates an embodiment of a network 500 employing an embodiment of a port multiplier enhancement mechanism. The illustrated network 500 provides a hub style or pyramid style cascading enhancement of a port multiplier 504. Unlike fifteen levels of port multipliers and devices in the daisy chain networking mechanism 400 of FIG. 4, in the illustrated embodiment, there are four levels 572-578 of port multipliers 504-532 and a single level 580 of network devices 534-560. The last port 570 of the port multiplier 532 is left unused or unassigned because, for example, a maximum number of fifteen devices 534-562 has been achieved. Again, it is to be contemplated, any number of devices (including greater than or less than fifteen devices) may be assigned; however, in this document the maximum number of fifteen devices is being used as an example for brevity, clarity, and consistency.

In one embodiment, the port multiplier 504 includes a standard 1:2 SATA port multiplier that is believed by the host 502 to be an enhanced 1:15 SATA port multiplier that is cascaded into being assigned to up to fifteen devices 534-562. This is performed by, first, connecting the top port multiplier 504 to the host 502 using a host port and communicating using a standard SATA communication signal 582. A couple of port multipliers 506, 508 are then connected with the top multiplier 504 using the two ports of the top multiplier 504 and communicating using an enhanced SATA communication signal 584. Similarly, the rest of the port multipliers 510-532 and devices 534-562 are connected and made to communicate with each other using the enhanced SATA communication signal.

Figure 5B:
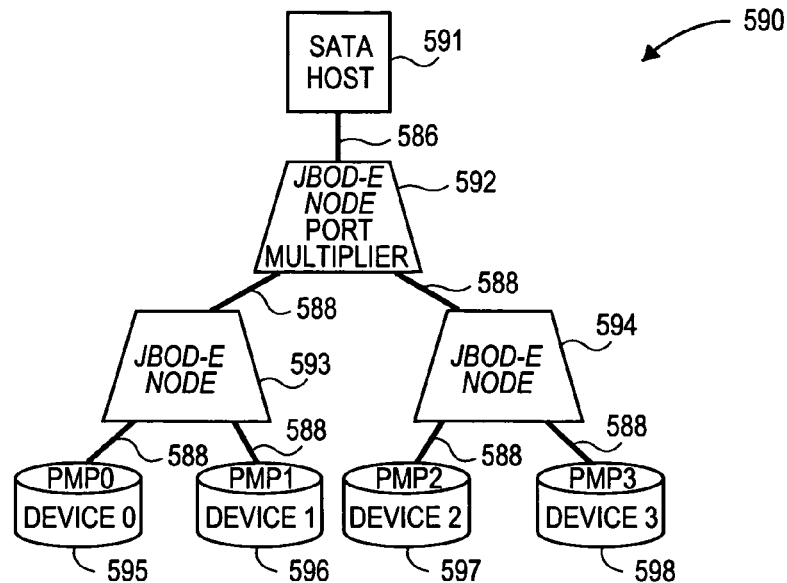

Although the illustrated embodiment employs fifteen port multipliers 504-532 and fifteen network devices 534-562, it is contemplated that any number of port multipliers or devices can be employed that can be less than or greater than fifteen. FIG. 5B, for example, illustrates such a network 590 employing an embodiment of a port multiplier enhancement mechanism. In the illustrated embodiment of FIG. 5B, a port multiplier 592 is in communication with a host 591. However, unlike the hub style networking mechanism 500 of FIG. 5A, in the illustrated embodiment of FIG. 5B, merely two more port multipliers 593, 594 are added to enhance the top port multiplier 592. The two additional port multipliers 593 594 are further enhanced to employ four network devices 595-598 with each of the two port multipliers 593, 594 using its two ports.

It is contemplated that various changes could be made to this hub style networking mechanism 590 and it can still be formed and practiced. For example, instead of another port multiplier 593, another network device may be employed in communication with the top port multiplier 592 using up its second (device) port while its first (host) port is being used by port multiplier 594. As with other illustrations, the communication signal between the SATA host 591 and the top port multiplier 592 is using a standard SATA communication signal 586, while rest of the port multipliers 593, 594 and the devices 595-598 communicate using an enhanced SATA communication signal 588. In one embodiment, networks 500, 590 are JBOD-E standard networks employing the JBOD-E protocol; however, other forms of protocols are contemplated and can be employed.

Figure 6:
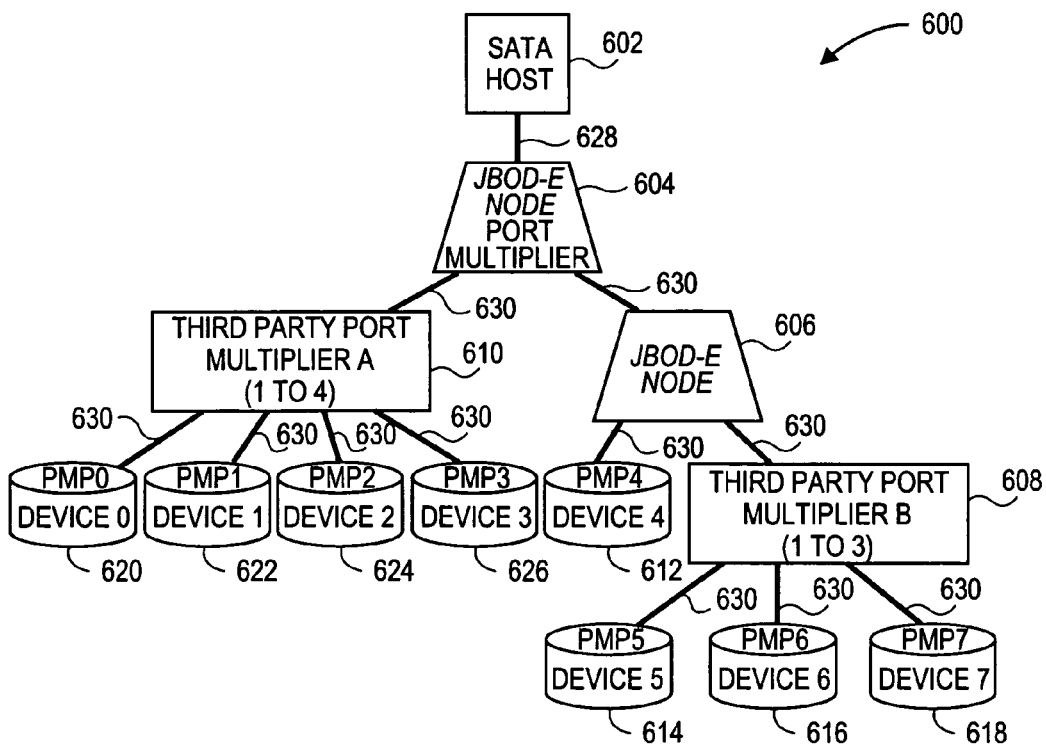
FIG. 6 illustrates an embodiment of a network employing an embodiment of a port multiplier enhancement mechanism.

FIG. 6 illustrates an embodiment of a network 600 employing an embodiment of a port multiplier enhancement mechanism. In the illustrated embodiment, the network 600 employs a hub style cascading including third-party port multipliers 608, 610 that are subject to a different specification and/or made by a different manufacturer and yet, the two port multipliers 608, 610 using the enhanced port multiplier technique and protocol are used with the other two standard port multipliers 604, 606. For example, the two third-party multipliers 608, 610 may not be compatible with the JBOD-E protocol and they may not have the two standard SATA port s(e.g., port multiplier 608 is 1:3 having three port, and port multiplier 610 is 1:4 having four ports, etc.) and yet, using the enhanced port multiplier mechanism, according to one embodiment, the two third-party port multipliers 608, 610 are made to work with the two 1:2 SATA port multipliers 604, 606.

The top port multiplier 604, in one embodiment, is in communication with a host port of a host 602 and in further in communication with a JBOD-E-compatible SATA port multiplier 606 and a third-party port multiplier 610. The third party port multiplier 610 has four ports and is connected with four network devices 620-626. Port multiplier 606 is connected with a network device 630 via a device port and is further connected with a third-party port multiplier 608 via a host port of the port multiplier 606. The third party port multiplier 608 has three ports and is connected with three network devices 614-616. As with other cascading networking mechanisms described in this document, this third-party hub cascading network 600 also employs a standard SATA communication signal 628 between the host 602 and the top port mechanism 604 such that the host 602 is faked into recognizing the top port multiplier 604 to be an enhanced 1:15 port multiplier having fifteen ports. However, the communication signal between port multipliers 604-610 and network devices 612-626 is an enhanced communication SATA signal 630.

In one embodiment, enumeration and numbering occurs during power-on and/or hot-plugging/unplugging events; however, in either case, the SATA host 602 may not be aware of the enumeration process. The top port multiplier 604 acts as if it was a 1:15 SATA port multiplier and therefore, the SATA host 602 sees or recognizes the top port multiplier 604 as a 1:15 SATA port multiplier. JBOD-E standard, for example, supports third-party port multipliers 608, 610 that are in compliant with SATA port multiplier specification. When a command is placed to access a third-party port multiplier 608, 610, the third-party port multipliers 608 and 610 are exposed to their respective parent enhanced port multipliers 606 and 604.

During power-on, for example, after receiving a command of "software reset" from the host 602, the top port multiplier 604 issues a software reset command to the connected third-party node 610 as well as to the next (child) node port multiplier 606 which acts as a parent node to the other third-party port multiplier 608 sends the command to it. This continues until the command reaches ATA/ATAPI-based network drives 612-626. Not each SATA node 604, 606, 608, 610 has to wait the completion of subsequent software reset commands before sending a register FIS device 612-626 to the host 602. If the signature of the software reset command is that of a port multiplier 604, 606, then the model number and vendor identification (ID) or Global Status Control Register (GSCR) (e.g., GSCR[0]) of the node 604, 606 is read to determine whether node 604, 606 is JBOD-E compatible. If the node 604, 606 is JBOD-E compatible, then a current node reads route map (RouteMap) registers of its node 604, 606. Further, each node 604, 606 does not need to respond until its route map register contains valid information.

In the illustrated embodiment, the top port multiplier 604 serves as a parent node to port multiplier 606 and the third-party port multiplier 610. The top port multiplier 604 serves as a top node since there is no other port multiplier node above it, but it also serves as a bottom node—to the third-party port multiplier 610—in the network 600. Similarly, port multiplier 606 serves as a child node to the top port multiplier 604, while it serves a parent node to the third-party port multiplier 608 in the network 600. Port multiplier 606 does serves as a bottom—to the third-party port multiplier 608—in the network 600. In contrast, port multiplier 604 is regarded a top node without a parent or up node.

Figure 7:
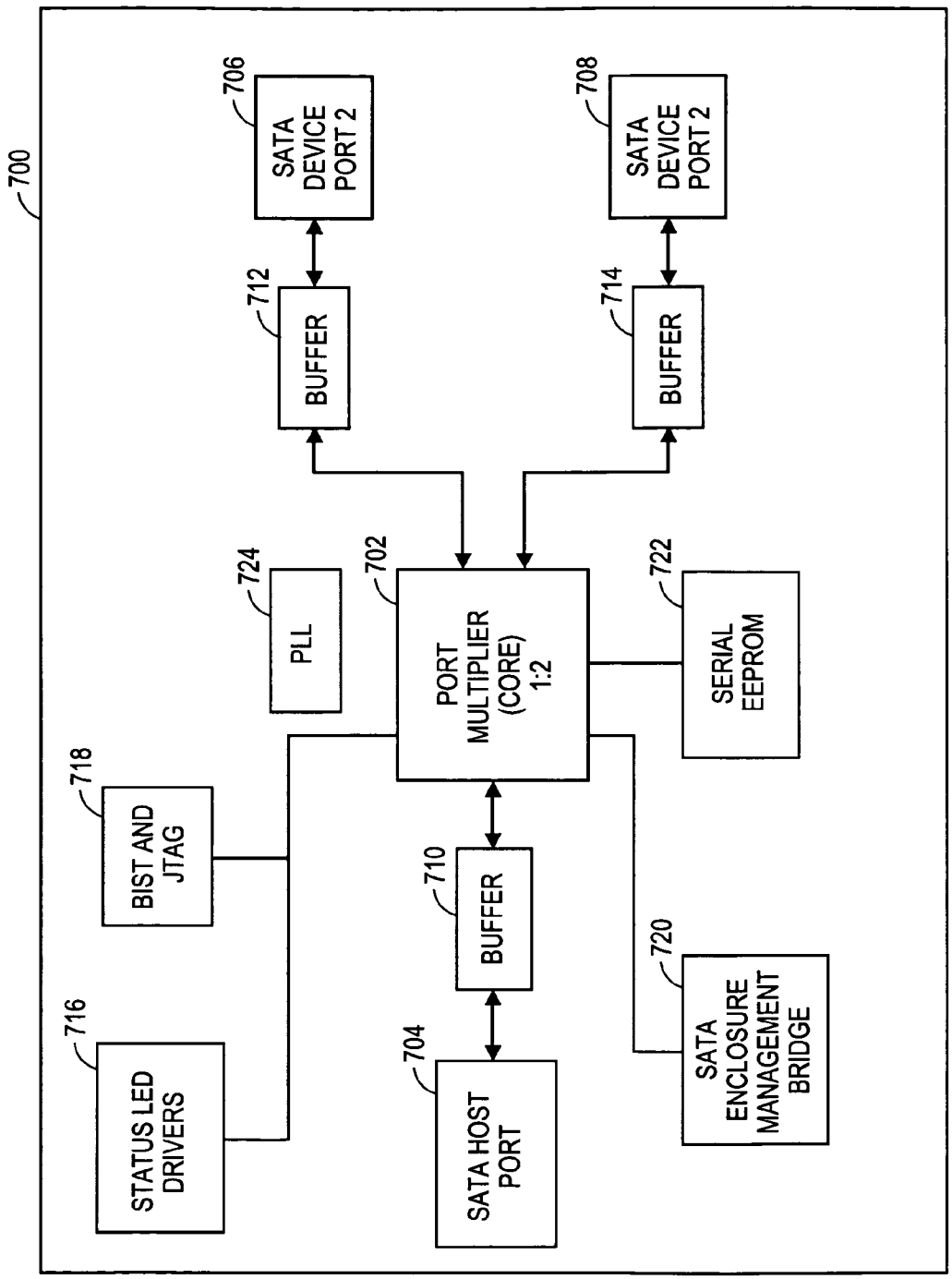
FIG. 7 illustrates an embodiment of a port multiplier.

FIG. 7 illustrates an embodiment of a port multiplier 700. The illustrated port multiplier 700 includes a standard SATA port multiplier that is capable of acting as an enhanced port multiplier to be employed in a network having a port multiplier enhancement mechanism, as described throughout this document. Port multiplier 700 includes two standard device ports 706, 708 (e.g., SATA device port) to adopt up two network devices. Employing an embodiment of a port multiplier enhancement mechanism, one of the device ports 706, 708 is used to serve as a host port to connect the port multiplier 700 to another port multiplier, while the other device port can still be used to serve as a device port to connect to a device. In another embodiment, both device ports 706, 708 can be used to serve as host ports to connect to two other port multipliers. This port multiplier enhancement mechanism to cascade port multipliers 700 is described throughout this document.

Port multiplier 700 further includes a host port 704 (e.g., SATA host port) that is used to connect to a network host (e.g., SATA host) if the port multiplier 700 serves as the top node port multiplier in a network, or used to connect to a parent node port multiplier if the port multiplier 700 serves as an intermediary or bottom node port multiplier in the network. Device ports 706, 708 and host port 704 are connected to port multiplier core 702 via a buffer 710-714.

Port multiplier 700 further includes status light emitting diode (LED) drivers 716, build-in-self-test (BIST) and Joint Test Action Group (JTAG) mechanisms 718, a phased-lock loop (PLL) 724, a serial Electrically Erasable Programmable Read-Only Memory (EEPROM) 722, and a SATA Enclosure Management Bridge (SEMB) 720. An LED refers to a semiconductor diode to emit an incoherent narrow-spectrum of light when electrically biased in the forward direction of the p-n junctions, as in the common LED circuit. BIST mechanism 718 within an integrated circuit (IC) is a function that verifies all or a portion of the internal functionality of the IC. For example, BIST mechanism 718 may be provided in advanced filedbus systems to verify functionality. JTAG 718 is the name often used for the IEEE 1149.1 standard entitled Standard Test Access Port and Boundary-Scan Architecture for test access ports used for testing printed circuit boards using boundary scan.

PLL 724 refers to an electronic control system that generates a signal that includes a fixed relation to the phase of a "reference" signal. It is a predecessor to the modern phase-locked loop. An EEPROM refers to a non-volatile storage chip used in computers and other devices to store small amounts of volatile data, e.g., calibration tables or device configuration. A serial EEPROM 722 typically operates in three phases: OP-Code Phase, Address Phase, and Data Phase. The OP-Code is usually the first 8-bits input to the serial input pin of the EEPROM device (or with most Inter-Integrated Circuit ($I^2C$) devices, is implicit); followed by 8 to 24 bits of addressing depending on the depth of the device, then data to be read or written. SEMB 720 passes in-band enclosure management data between a host controller and a companion enclosure management device through an $I^2C$ bus.

Figure 8:
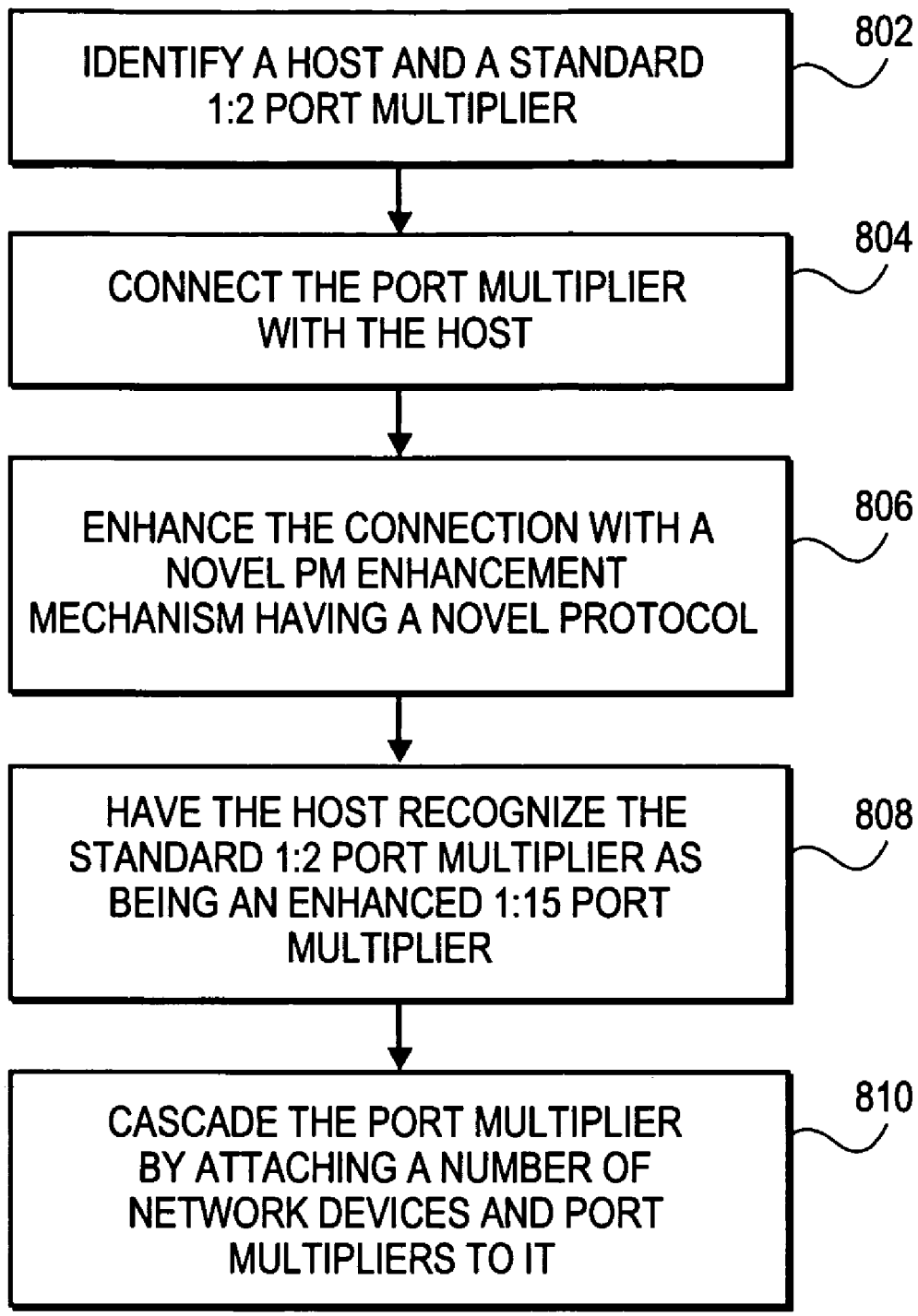
FIG. 8 illustrates an embodiment of a process for performing port multiplier enhancement.

FIG. 8 illustrates an embodiment of a process for performing port multiplier enhancement. A host (e.g., SATA host) and a standard two-port port multiplier (e.g., standard 1:2 SATA port multiplier) are identified at processing block 802. The host is then connected with the port multiplier using a host port at processing block 804. A communication between the host and the port multiplier is established via a communication signal including a standard communication signal (e.g., standard SATA communication signal). In one embodiment, a novel port multiplier enhancement mechanism having a novel port multiplier protocol is introduced to the host and the port multiplier at processing block 806. Using the enhancement mechanism, the host is faked into recognizing the standard two-port port multiplier has having more than two ports (e.g., fifteen ports) at processing block 808.

Once the host has begun to recognize the port multiplier as having more than two ports, the port multiplier serves as a top port multiplier and is cascaded into being connected with a number of port multipliers and network devices at processing block 810. As described in previous figures, cascading can be done in various formats (e.g., daisy chain, hub style, third party hub style, etc.) by adding one or more port multipliers and network devices to the chain until a maximum number (e.g., 15 devices and 15 port multipliers) is reached. This technique is further explained in preceding figures and elsewhere in this document.

Figure 9:
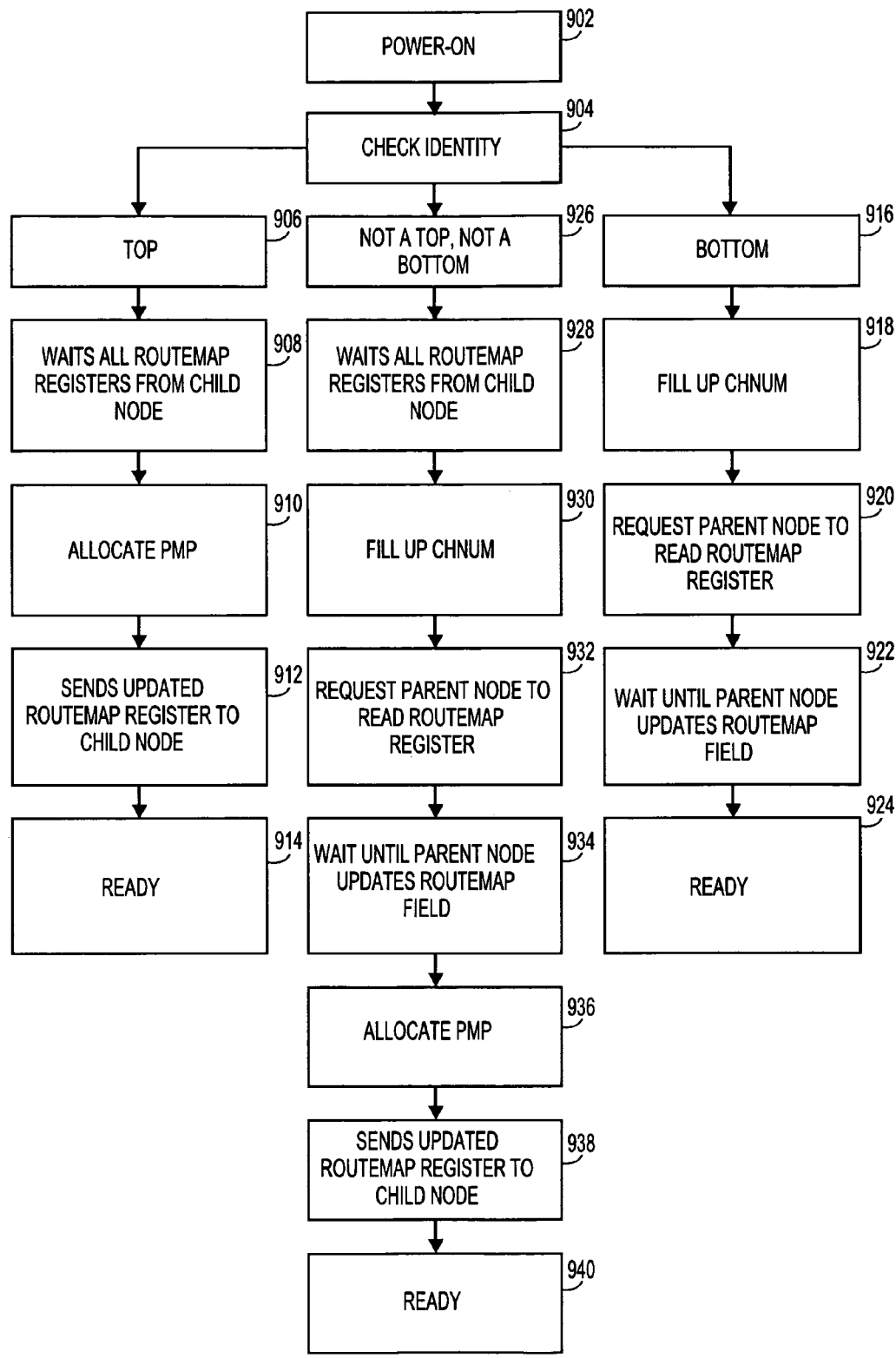

FIG. 9 illustrates an embodiment of a process for settling route map registers after power-on. In one embodiment, power-on is performed at processing block 902, followed by checking of the identity of a node at processing block 904. The three identities include a top node that can only be a parent at processing block 906, a bottom node that can only be a child at processing block 916, or an intermediary node that can be both a parent and child at processing block 926. If the node is identified as a top node (e.g., top port multiplier), the top node waits for RouteMap registers from its child node (not necessarily a bottom node) at processing block 908. At processing block 910, PMP is allocated. The updated RouteMap register is then sent to the child node at processing block 912, and the top node is then ready at processing block 914.

If the node is a bottom node, the Channel Number (CHNUM) is filled up at processing block 918. The bottom node's parent node (not necessarily the top node) of the bottom node is requested to read a RouteMap register at processing block 920. The bottom nodes waits until the parent node writes a RouteMap field at processing block 922, and the bottom node is then ready at processing block 924.

Referring back to processing block 926, if the node is identified as an intermediary node (e.g., not a top node or a bottom node), the intermediary node waits for RouteMap registers from its child node at processing block 928. At processing block 930, the CHNUM is filled up. At processing block 932, the intermediary node's parent node is requested to read a RouteMap register. The intermediary node then waits until the parent node updates a RouteMap field at processing block 934, and PMP is allocated at processing block 936. The parent node then sends the updated RouteMap register to the child node at processing block 938. The intermediary node is then ready at processing block 940.

Figure 10A:
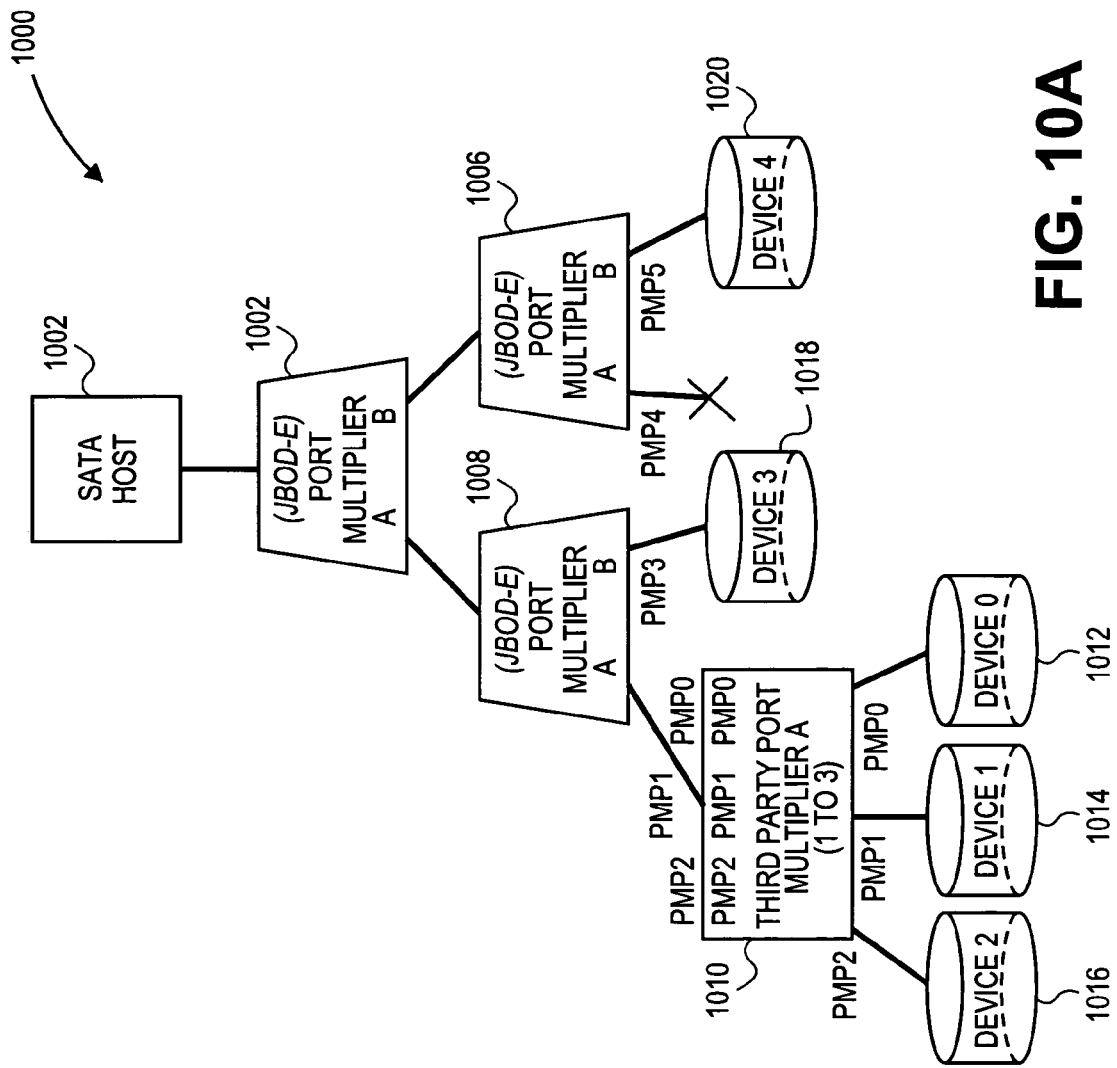
FIG. 10A illustrates an embodiment of a network employing a port multiplier enhancement mechanism and a mechanism for settling route map registers.

FIG. 10A illustrates an embodiment of a network 1000 employing a port multiplier enhancement mechanism and a mechanism for settling route map registers. In one embodiment, the route map (RouteMap) registers are settled after power-on and are made ready to start delivering FISes from host 1002. A RouteMap register for a node 1004-1008 (e.g., port multiplier 1006) contains information relating to a route map (RouteMap) for the node 1006. CHNUM_NODE refers to the number of devices 1020 under or in direct communication with the node 1006, while ROUTEMAP_NODE refers to a bit that corresponds to PMP (e.g., PMP5) belonging to the node 1006. A RouteMap register for a device 1010-1018 (e.g., first device, Dev0, 1012) contains information relating to the route map (RouteMap) for a device port of the first device, Dev0, 1012 in the network 1000. In this case, CHNUM_D0 refers to the total number of devices (e.g., device 1012) under Dev0 port, while ROUTEMAP_D0 refers to each bit corresponding to PMP (e.g., PMP0) belonging to the Dev0 port. Registers relating to other devices, Dev1-Dev4, 1014-1020 (in some cases, up to fifteen devices, Dev1-DevE), have the same information as the first device, Dev0.

Once the RouteMap registers are updated, getting access to remote devices is performed as follows. To perform a host-to-device transfer of data, a node 1006-1010 receives PMP numbers (e.g., PMP0-PMP5) from an FIS header, looks up the RouteMap register, and determines which device port to send the FIS. In case of performing device-to-host transfer of data, a bottom node 1106-1008 (e.g., a node that is directly attached to a device 1012-1020 or a third-party port multiplier 1010), updates the PMP field accordingly, and a non-bottom node (e.g., third-party port multiplier 1010) passes the FIS without any modification. Further, in case of a host-to-device transfer of data, if the target PMP does not exist, then the FIS is terminated using SyncEscape mechanism as defined in the SATA specification. If the access is to read the PSCR section, and the target PMP exists, then a PortNum is used to get route information. For the top node 1004, if the access is to read the PSCR section, and the target PMP does not exist, then the pre-determined default value is returned to the host 1002. To avoid a collision that is impossible to resolve by re-transmission, all ports in JBODE are able to receive the entire FIS. To guarantee that an FIS from the host port of the host 1002 is able to reach the destination device ports of the devices 1012-1020, a parent node is given a higher priority in case of a potential bus collision (e.g., XRDY-XRDY collision of the SATA specification) so that the bus potential collision could be avoided and the data could flow freely.

In one embodiment, JBOD-E supports third-party port multipliers 1010 that are part of the network 1000 as long as these third-party port multipliers 1010 are in compliance with the SATA Port Multiplier specification. For example, the node 1008 issues a series of commands to access the third-party port multiplier 1010, and expose the ports from the third-party port multiplier 1010 to its parent node 1004 which in this example is the top port multiplier 1004. The node 1008 issues a command (e.g., software reset command) to a PMP to the third-party port multiplier 1010. The node 1008 is read GSCR[0] to get device identifications of the devices 1012-1016 and determine whether the third-party port multiplier 1010 was JBOD-E compatible. The node 1008 then reads GSCR[2] to get the number of device ports of the third-party port multiplier 1010. The node 1008 returns the number of device ports to the parent 1004 via the RouteMap register. The node 1002 maintains a table that converts the RouteMap information to the actual PMP of the third-party port multiplier 1010. Further, the table format may be implementation specific and may not need to be exposed to host 1002.

FIG. 10B illustrates an embodiment of a route map register 1050 for a port multiplier 1004-1008. The illustrated embodiment of the route map (RouteMap) register 1050 for a port multiplier node 1004, 1006, 1008 includes information on route map for the node 1004, 1006, 1008 having a section of CHNUM_NODE 1052 including a total number of devices under the current node (such as one device 1020 for the node 1006), and a section of ROUTEMAP_NODE 1056 including each bit corresponding to PMP belonging to the current node (such as PMP5 of the node 1006 corresponding to the device 1020). The register 1050 further includes a reserved section 1054 to include other relevant information.

FIG. 10C illustrates an embodiment of a route map register 1060 for a device port for a device 1012-1020. The illustrated embodiment of the route map (RouteMap) register 1060 for device ports for devices 1012-1020 includes information on route map for the device ports having a section of CHNUM_D0 1062 including a total number of devices under a particular device port, such as D0 for device 1012, and a section of ROUTEMAP_D0 1066 including each bit corresponding to PMP belonging to the that particular device port (such as PMP0 of the device port corresponding to the first device, D0, 1012). The register 1060 further includes a reserved section 1064 to include other relevant information.

FIGS. 11A-11F illustrate an embodiment of a transaction sequence for settling route map registers. FIG. 1A illustrates a port multiplier enhancement network 1100 having a SATA host 1102 and three JBOD-E compliant SATA port multipliers 1104-1108, devices including HDD drives 1112-1120 of which drives 1118, 1120 may include SATA drives. The other three device 1112-1116 are connected with a third-party port multiplier 1110. In the illustrated embodiment, there are three RouteMap registers, each corresponding to a JBOD-E compliant port multiplier 1104-1108, that are to be updated.

Figure 11B:
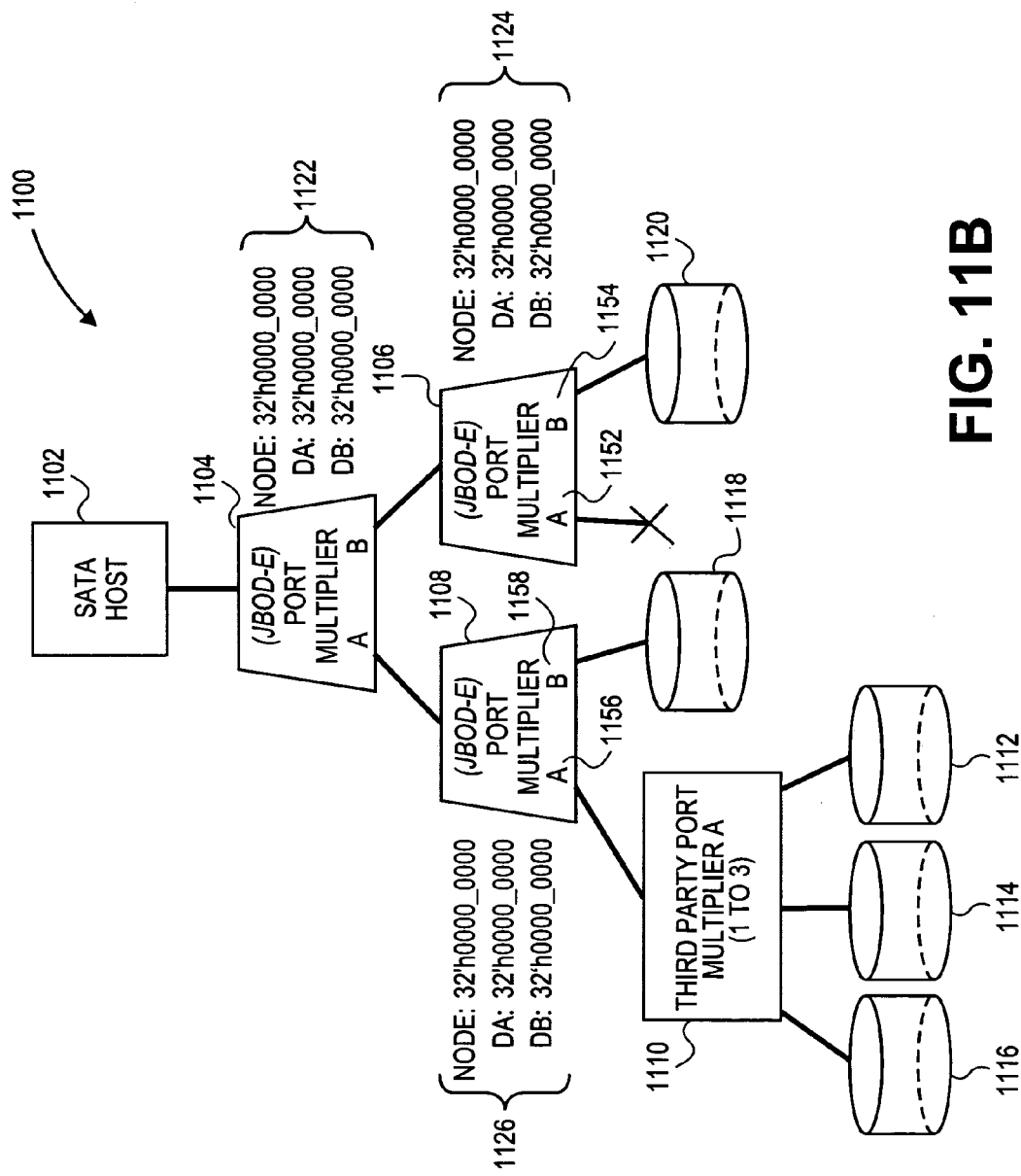
Figure 11C:
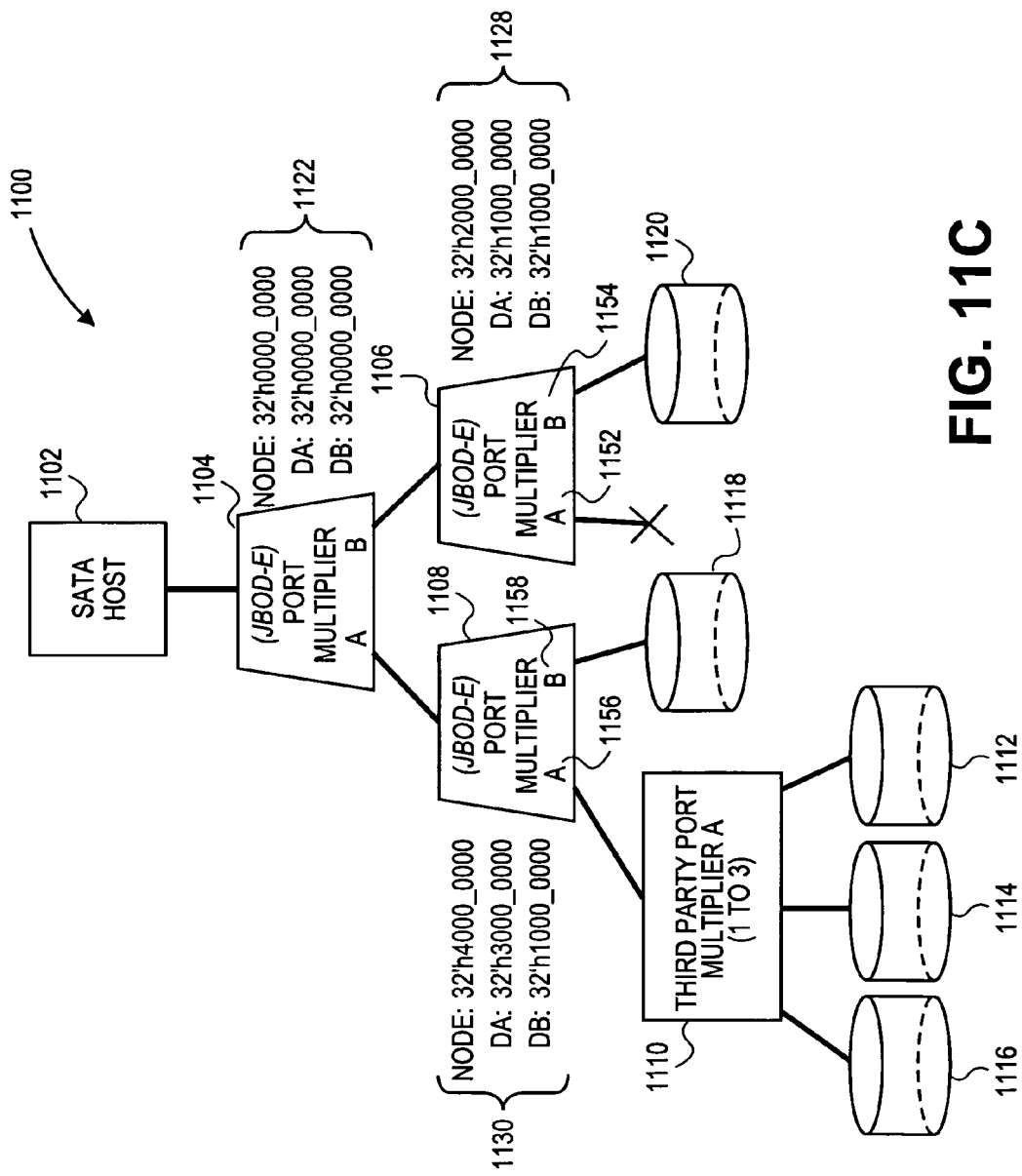

FIG. 11B illustrates RouteMap registers 1122, 1124, 1126 associated with port multiplier nodes 1104, 1106, 1108. The RouteMap registers 1122, 1124, 1126 are set to be cleared to zero as illustrated. FIG. 11C illustrates reading of RouteMap registers 1122, 128, 1130 starting with the bottom nodes 1106, 1108. For example, when a device port 1154, 1158 (e.g., device port B 1154 of node 1106 and device port B 1158 of node 1108) is connected to a single device 1120, 1118, the CHNUM number 1128, 1130 for the respective device port, DB, 1154, 1158 is one. Similarly, when a device port, DA, 1152 is not connected to any devices, the CHNUM 1128 for that device port, DB, 1152 is also one. However, as illustrated, if a device port 1156 is connected to a port multiplier 1110, the CHNUM 1130 for that device port, DA, 1156 is the number of devices 1112, 1114, 1116 that are connected to the port multiplier 1110, which in this case is three for the three devices 1112, 1114, 1116. This information is obtained by reading GSCR[2] of the port multiplier 1110. CHNUM 1130 of RouteMap register for the node number 1130 for the node 1110 is merely adding up CHNUM of each RouteMap register for the device ports 1156, 1158, which in this case is four due to the four devices 1112, 1114, 1116, 1118.

Figure 11D:
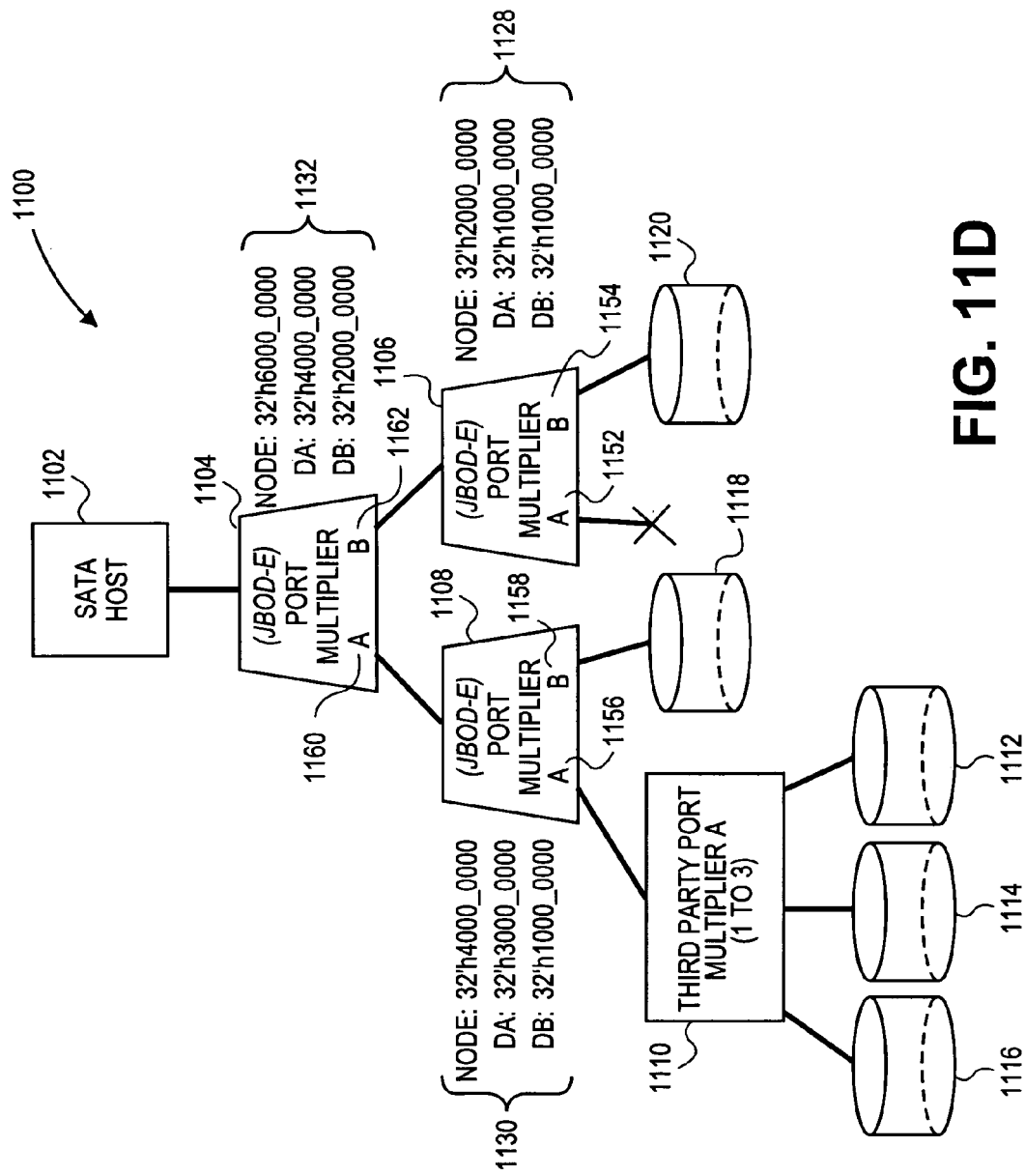

Similarly, as illustrated in FIG. 11D, CHNUM 1132 for device ports DA 1160 and DB 1162 for the parent or top port multiplier node 1104 is the total of number devices 1112, 1114, 1116 and 1118, 1120, respectively, connected via the bottom or child port multiplier 1106 and 1108. In this case CHNUM 1132 for device port DA 1160 is four for the child port multiplier device ports DA 1152, 1156, and for device port DB 1162, the number is two for the child port multiplier device ports DB 1154, 1158. The node number 1132 for the port multiplier node 1104 is six, which is a combination of DA and DB numbers 1132 of four and two, respectively. The top port multiplier 1104 then allocates PMPs to each of the device ports DA 1152 (representing one port with no device), DB 1154 (representing one port with one device 1120), DB 1158 (representing one port with one device 1118), and DA 1156 (representing three ports with three devices 1112, 1114, 1116 via the third-party port multiplier 1110).

Figure 11E:
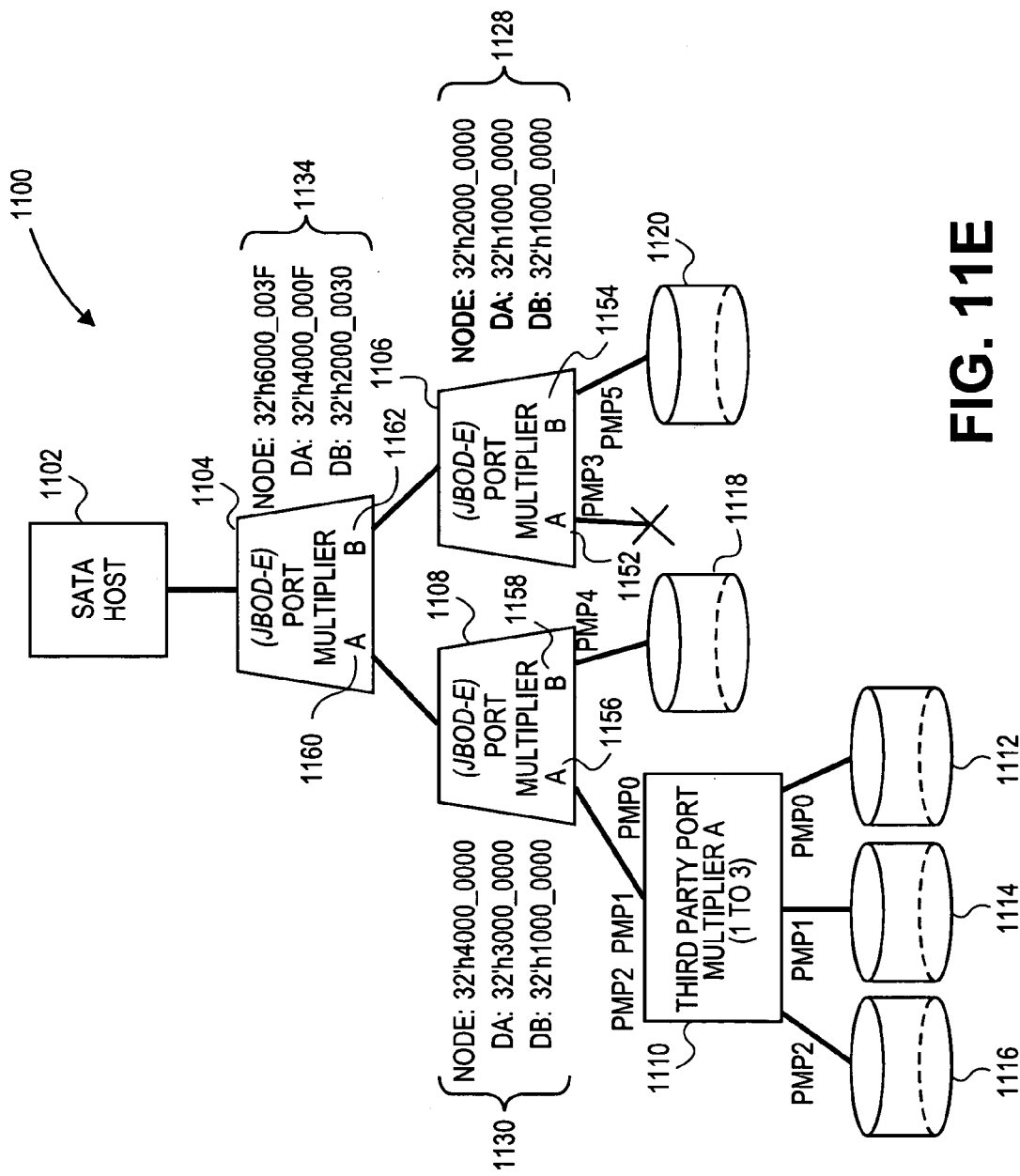

Referring now to FIG. 11E, an embodiment of a PMP allocation mechanism is implemented. In one embodiment, the PMP allocation mechanism includes a PMP allocation algorithm and is implementation-specific. In the illustrated embodiment, PMPs are simply allocated from a low number to a high number to each of the device ports 1152, 1154, 1156, 1158. Accordingly, the top port multiplier node 1104 assigns PMP0, PMP1, PMP2, and PMP4 to device ports A 1152, 1156 and PMP4, PMP5 to device ports B 1154, 1156. The top port multiplier 1104 then updates the node numbers (NODE) of the RouteMap registers 1134, 1136, 1138, while the child port multipliers 1106, 1108 then update the device port numbers (DA, DB) of the RouteMap registers 1134, 1136, 1138. Referring now to FIG. 11F, the top node 1104 updates RouteMap registers (NODE) 1136 and 1138 for its child nodes 1106 and 1108, while the child nodes 1106, 1108 update RouteMap registers (DA, DB) 1136, 1138 for its devices 1120, 1112-1116, 1118.

In one embodiment, network devices are interconnected in a client/server network system, such as a personal entertainment network. The network mechanisms of the preceding figures are part of various networks. A network may include a Local Area Network (LAN), Wide Area Network (WAN), Metropolitan Area Network (MAN), intranet, the Internet, etc. As stated elsewhere in this document, any number of network devices can be cascaded into being connected with a port multiplier forming a networking mechanism within a network. It is contemplated that there may be any number of devices connected via the network 1025. A device may transfer data streams, such as streaming media data, to other devices in the network system via a number of standard and non-standard protocols, including the protocols described in this document.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), EEPROM, magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:

a top port multiplier of a plurality of port multipliers configured to couple a network host with other port multipliers of the plurality of port multipliers, wherein the top port multiplier includes an enhanced port multiplier to establish and maintain communication with each of the other port multipliers to facilitate communication, in multiple cascading levels, between the network host, other port multipliers, and a plurality of network devices, the other port multipliers having one or more intermediate port multipliers and one or more bottom port multipliers, wherein the one or more intermediate port multipliers include one or more enhanced intermediate port multipliers to facilitate additional one or more cascading levels, wherein the one or more intermediate port multipliers and the one or more bottom port multipliers include one or more third-party port multipliers to facilitate communication between the network host and one or more third-party network devices, wherein each of the plurality of port multipliers serves as a node having a route map register to facilitate communication with other port multipliers of the plurality of port multipliers and the one or more third-party port multipliers, wherein the top port multiplier serves as a parent node, wherein each of the one or more bottom port multipliers serves as a child node, and wherein each of the one or more intermediate port multipliers serves a child/parent node; and the plurality of network devices including the one or more third-party network devices.

2. The apparatus of claim 1, wherein the top port multiplier is configured to communicate with the network host via a standard Serial Advanced Technology Attachment (SATA) signal.

3. The apparatus of claim 1, wherein the top port multiplier is configured to communicate with the intermediate and bottom port multipliers via an enhanced SATA signal.

4. The apparatus of claim 1, wherein each of the plurality of port multipliers contain registers to manage routing of data, wherein each register contains a route map for the data.

5. The apparatus of claim 1, wherein the network host is configured to send a Frame Information Structure (FIS) from the network host to the plurality of port multipliers once the registers are settled.

6. The apparatus of claim 1, wherein each of the plurality of port multiplier comprises a SATA port multiplier having two ports.

7. A system comprising:

a port multiplied network configured to couple a network host to a plurality of network devices via a plurality of port multipliers over multiple cascading levels, the port multiplied network including:

a top port multiplier of the plurality of port multipliers configured to couple the network host with other port multipliers of the plurality of port multipliers, wherein the top port multiplier includes an enhanced port multiplier to establish and maintain communication with each of the plurality of port multipliers to facilitate communication, in the multiple cascading levels, between the network host, other port multipliers, and a plurality of network devices, the other port multipliers having one or more of intermediate port multipliers and one or more bottom port multipliers, wherein the one or more intermediate port multipliers include one or more enhanced intermediate port multipliers to facilitate additional one or more cascading levels, wherein the one or more intermediate port multipliers and the one or more bottom port multipliers include one or more third-party port multipliers to facilitate communication between the network host and one or more third-party network devices, wherein each of the plurality of port multipliers serves as a node having a route map register to facilitate communication with other port multipliers of the plurality of port multipliers and the one or more third-party port multipliers, wherein the top port multiplier serves as a parent node, wherein each of the one or more bottom port multipliers serves as a child node, and wherein each of the one or more intermediate port multipliers serves a child/parent node; and the plurality of network devices including the one or more third-party network devices.

8. The system of claim 7, wherein the top port multiplier is configured to communicate with the network host via a standard Serial Advanced Technology Attachment (SATA) signal.

9. The system of claim 7, wherein the top port multiplier is configured to communicate with the plurality of port multipliers via an enhanced SATA signal.

10. The system of claim 7, wherein each of the plurality of port multipliers contain registers to manage routing of data, wherein each register contains a route map for the data.

11. The system of claim 7, wherein the network host is configured to send a Frame Information Structure (FIS) from the network host to the plurality of port multipliers.

12. The system of claim 7, wherein each port multiplier comprises a SATA port multiplier having two ports.

13. A method comprising:

coupling a network host with a plurality of network devices via a plurality of port multipliers over multiple cascading levels, wherein the plurality of port multiplier includes a top port multiplier configured to couple the network host with other port multipliers of the plurality of port multipliers, wherein the top port multiplier includes an enhanced port multiplier to establish and maintain communication with each of the plurality of port multipliers to facilitate communication, in the multiple cascading levels, between the network host, other port multipliers, and a plurality of network devices, the other port multipliers having one or more of intermediate port multipliers and one or more bottom port multipliers, wherein the one or more intermediate port multipliers include one or more enhanced intermediate port multipliers to facilitate additional one or more cascading levels, wherein the one or more intermediate port multipliers and the one or more bottom port multipliers include one or more third-party port multipliers to facilitate communication between the network host and one or more third-party network devices, wherein each of the plurality of port multipliers serves as a node having a route map register to facilitate communication with other port multipliers of the plurality of port multipliers and the one or more third-party port multipliers, wherein the top port multiplier serves as a parent node, wherein each of the one or more bottom port multipliers serves as a child node, and wherein each of the one or more intermediate port multipliers serves a child/parent node; and establishing communication between the plurality of network devices, the plurality of port multipliers, and the network host, wherein the plurality of network devices includes the one or more third-party network devices.

14. The method of claim 13, further comprising establishing communication between the top port multiplier and the network host via a standard Serial Advanced Technology Attachment (SATA) signal.

15. The method of claim 13, further comprising establishing communication between the plurality of port multipliers via an enhanced SATA signal.

16. The method of claim 13, further comprising managing routing of data via registers residing at each of the plurality of port multipliers, wherein each register contains a route map for the data.

17. The method of claim 16, further comprising sending a Frame Information Structure (FIS) from the network host to the plurality of port multipliers once the registers are settled.

18. The method of claim 13, wherein each port multiplier comprises a SATA port multiplier having two ports.

* * * * *